Figures 1, 2:
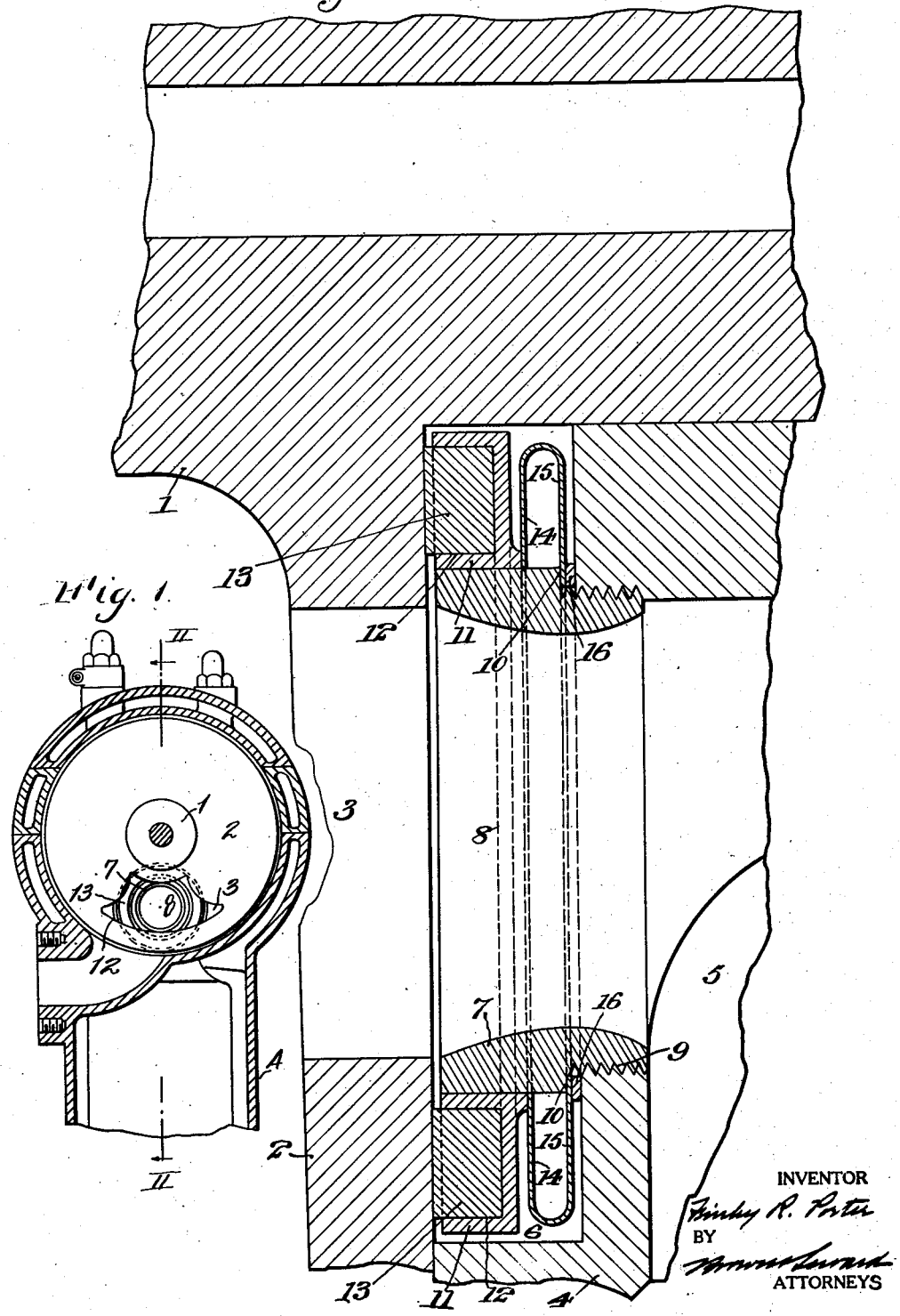

July 27, 1926.

F. R. PORTER 1,593,988

INTERNAL COMBUSTION ENGINE

Filed March 13, 1924

INVENTOR
Finley R. Porter
BY
ATTORNEYS

Patented July 27, 1926.

1,593,988

UNITED STATES PATENT OFFICE.

FINLEY R. PORTER, OF NEW YORK, N. Y., ASSIGNOR TO PORTER ENGINE DEVELOPMENT, INC., OF NEW YORK, N. Y., A CORPORATION OF NEW YORK.

INTERNAL-COMBUSTION ENGINE.

Application filed March 13, 1924. Serial No. 699,081.

This invention relates more particularly to internal combustion engines of the rotary disc valve type.

One object of my invention is to provide an internal combustion engine of the rotary disc valve type in which the packing ring for the valve disc surrounds the cylinder port, which packing ring is provided with an oil impregnated self lubricating element of hard material, such as metal, held against the valve disc, thus obviating the necessity of providing a separate supply of oil for the parts at this point.

Another object is to provide a novel resilient means for holding the packing ring in engagement with the rotary valve disc, said means including a compound diaphragm in which the inner edge of one wall of the diaphragm is engaged with the cylinder and the inner edge of the other wall is engaged with the packing ring as, for instance, by being permanently joined thereto, said compound diaphragm serving, because of its structure, to materially reduce its tendency to set and also maintaining its flexibility, thus materially prolonging its life and rendering it readily susceptible to variations in fluid pressure.

A further object is to provide certain improvements in the construction, form and arrangement of the several parts.

A practical embodiment of my invention is represented in the accompanying drawings in which Fig. 1 represents a detail cross section through an internal combustion engine of the rotary disc valve type with my improvement applied thereto; and Fig. 2 represents an enlarged detail section taken in the plane of the line II—II of Fig. 1.

The rotary valve 1 is herein illustrated as a rotary disc valve, the disc 2 being provided with a fluid port 3 therethrough.

The engine cylinder casing is denoted by 4 and its combustion chamber by 5. This cylinder casing 4 is provided with an annular packing chamber 6 opening toward the face of the valve disc 2. A removable cylinder member 7 is provided with a port 8 therethrough in communication with the combustion chamber 5. The port 3 in the valve disc 2 is arranged to be brought into and out of communication with the cylinder port 8 as the valve is rotated.

This cylinder member 7 is screw-threaded into the cylinder casing, as shown at 9, and at the base of the screw-threaded portion the member 7 is provided with an annular shoulder 10.

A packing ring 11 surrounds the cylinder member 7 and is located within the packing chamber 6, which packing ring is provided with an annular recess 12 opening through the face of the ring, within which recess a removable insert 13 is located, which insert projects slightly beyond the face of the packing ring into communication with the face of the valve disc 2.

This insert 13 is composed of an oil impregnated self lubricating hard material, preferably metal. When this oil impregnated element 13 looses its oil content, the element may be removed and reimpregnated with oil or it may be replaced with a new oil impregnated self lubricating element. The particular material which I have found advantageous to use is "genalite", an improved bearing alloy of synthetic bronze and graphite, molded into shape and having sufficient porosity to absorb from 2% to 3% by weight of lubricating oil; which material is produced by the General Electric Company of Schenectady, N. Y.

A compound diaphragm is located within the packing chamber 6, which compound diaphragm acts as a resilient means for holding the oil impregnated self lubricating element 13 in engagement with the face of the valve disc 2. The inner edge of one wall 14 of this compound diaphragm is engaged with the back wall of the packing ring 11 at the inner periphery of the packing ring, said inner edge being preferably permanently joined to said packing ring to form a gas tight joint, as, for instance, by welding. The other wall 15 of the compound diaphragm has its inner edge clamped between the shoulder 10 of the cylinder member 7 and the cylinder casing to form a gas tight joint, a soft metal washer 16 being preferably interposed between the said inner edge of the cylinder at the bottom of the packing chamber 6.

From the above description it will be seen that the packing ring and its resilient compound diaphragm may be readily removed for renewal or repair by the removal of the cylinder member 7.

It will also be seen that this compound diaphragm provides a very resilient and flexible means for holding the oil impregnated self lubricating element of the packing ring against the face of the valve disc at the proper pressure, notwithstanding the variations in pressure of the fluid passing through the ports, the pressure of any fluid which may leak into the interior of the compound diaphragm being trapped therein and exerting its force equally against both walls thereof. Furthermore, a minimum movement of any particular part of the diaphragm is provided by this compound arrangement, thus preventing any liability of the setting of the diaphragm from constant use.

It is evident that this structure may be utilized for either the inlet or exhaust port, or both.

It is also evident that various changes may be resorted to in the construction, form and arrangement of the several parts without departing from the spirit and scope of my invention; hence, I do not wish to be limited to the particular embodiment herein shown and described, but—

What I claim is:—

1. In an internal combustion engine, a cylinder, a rotary valve, a packing ring therefor, and a compound diaphragm having inwardly extended substantially parallel walls, the inner unjoined edges of said walls having gas tight joints with the packing ring and cylinder respectively, said compound diaphragm acting as a resilient means for holding the packing ring in engagement with the valve.

2. In an internal combustion engine, a cylinder having a port and a packing chamber surrounding said port, a rotary valve having a port, a packing ring located in said chamber and surrounding said cylinder port, and a compound diaphragm located in said packing chamber and acting as a resilient means for holding the packing ring in engagement with the valve, said compound diaphragm having inwardly extended substantially parallel walls, the inner edges of said walls having gas tight joints with the packing ring and cylinder respectively.

In testimony, that I claim the foregoing as my invention, I have signed my name this 5th day of March 1924.

FINLEY R. PORTER.